No. 762,516. PATENTED JUNE 14, 1904.
C. R. DAVIS.
FOOT LIFT FOR WHEEL PLOWS.
APPLICATION FILED NOV. 17, 1903.
NO MODEL. 3 SHEETS—SHEET 2.
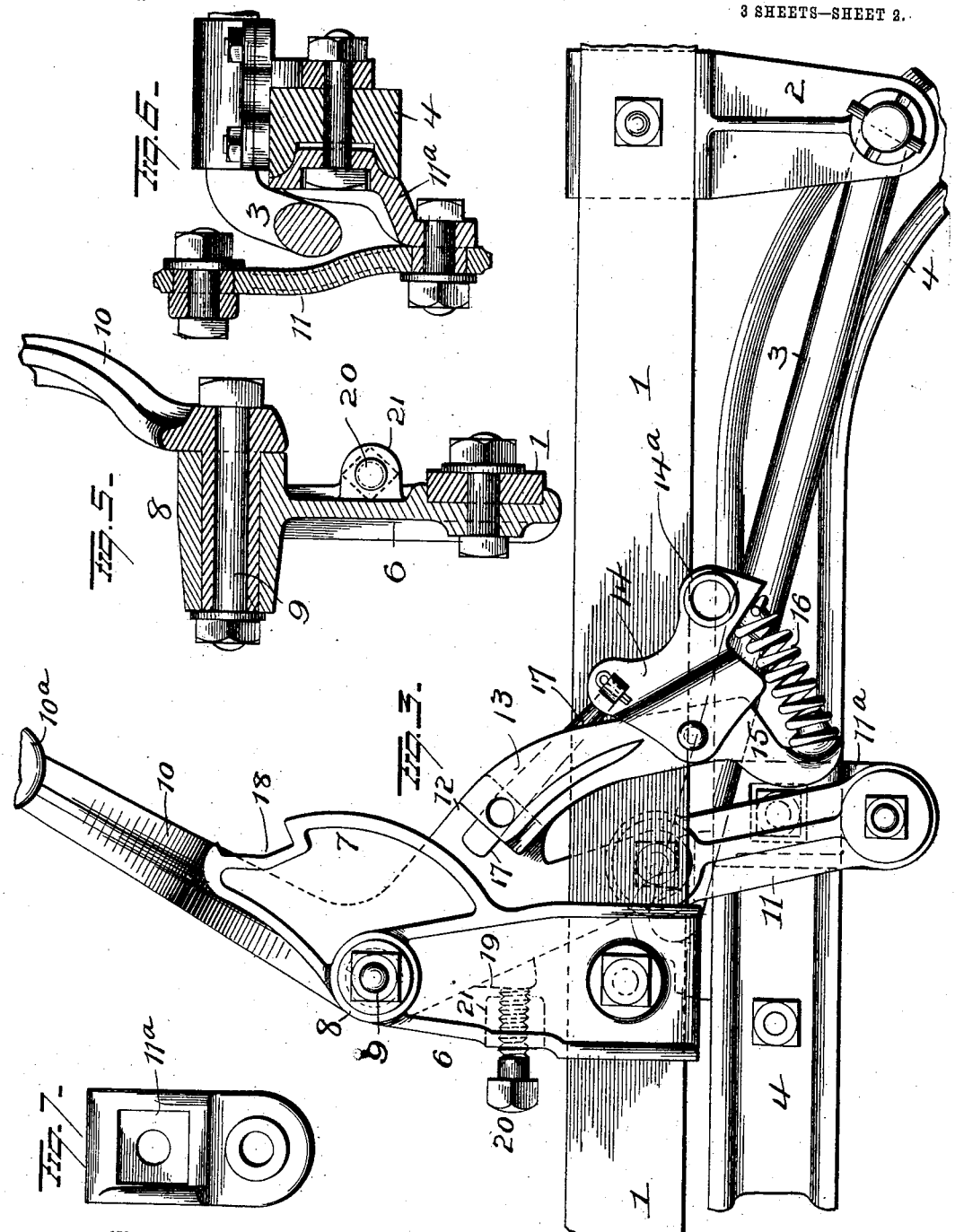

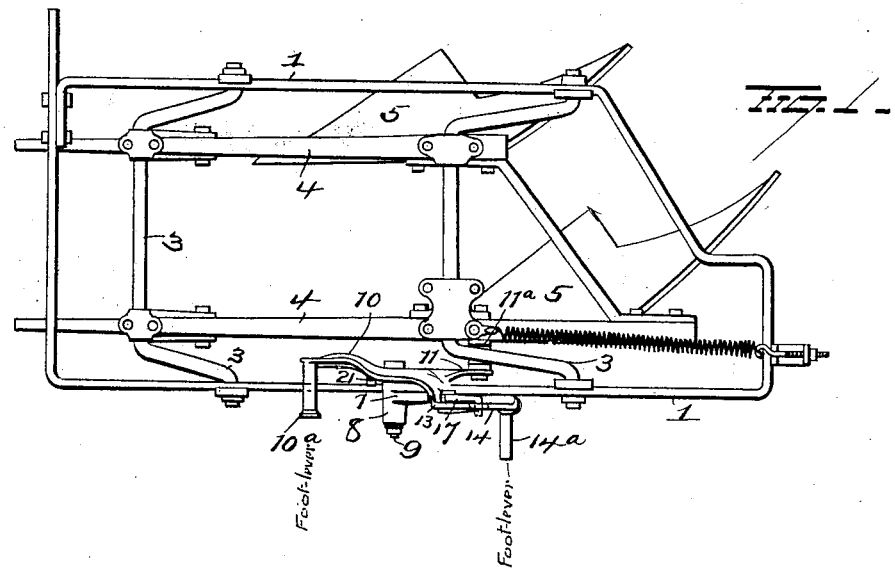
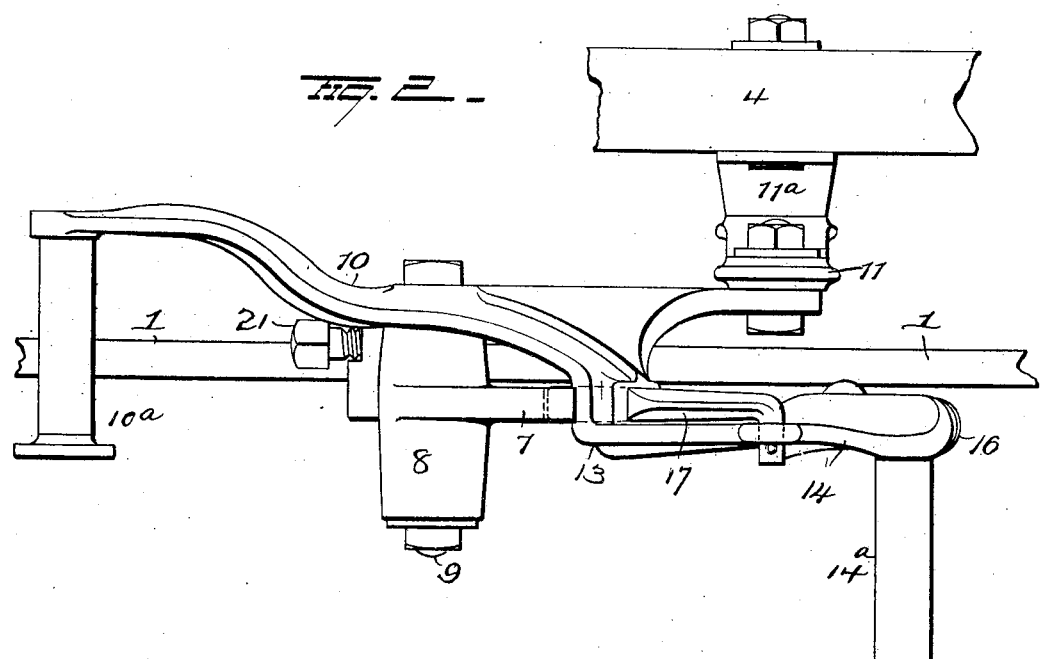

No. 762,516. PATENTED JUNE 14, 1904.
C. R. DAVIS.
FOOT LIFT FOR WHEEL PLOWS.
APPLICATION FILED NOV. 17, 1903.
NO MODEL. 3 SHEETS—SHEET 3.
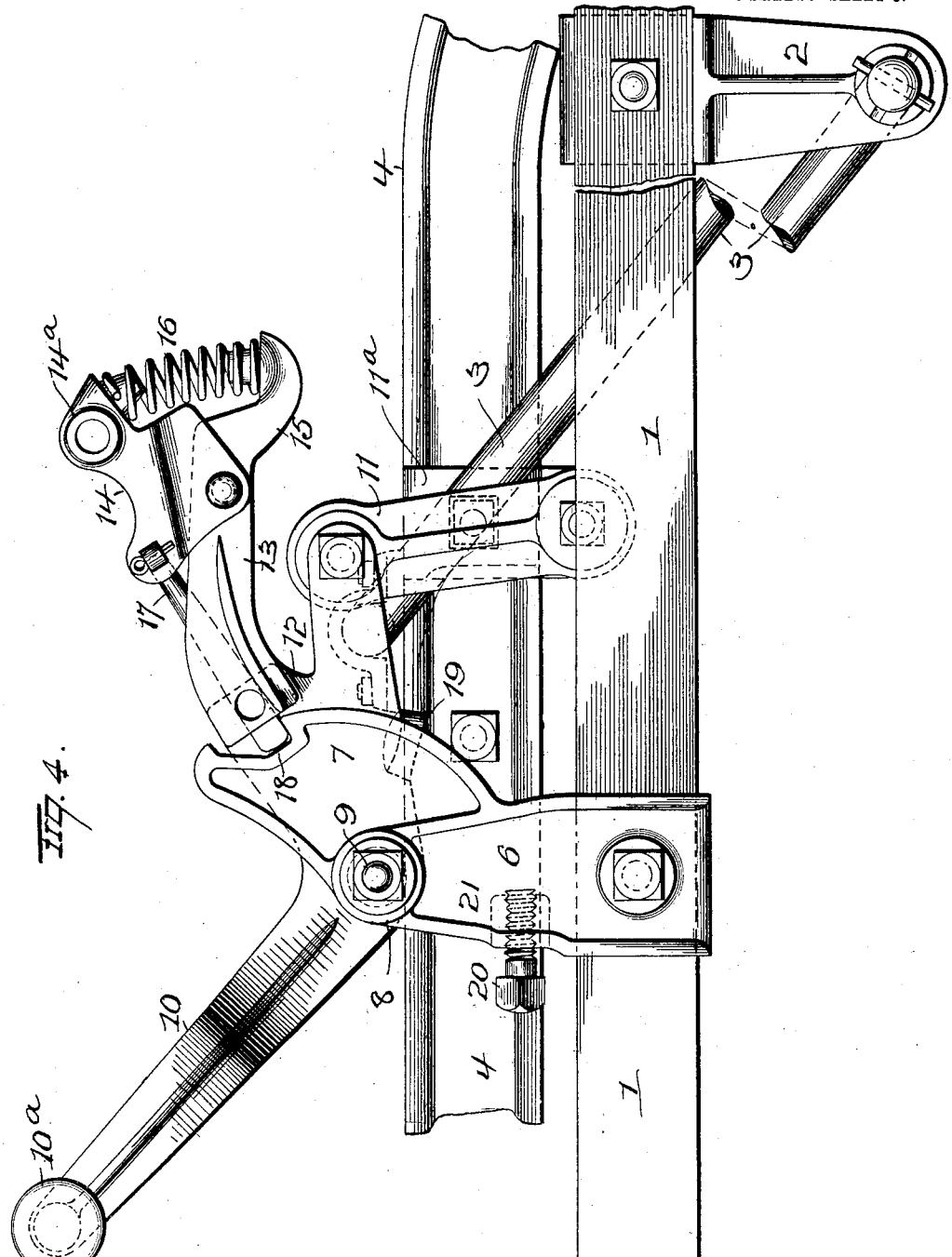
WITNESSES
INVENTOR No. 762,516.                                                   Patented June 14, 1904.

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

FOOT-LIFT FOR WHEEL-PLOWS.

SPECIFICATION forming part of Letters Patent No. 762,516, dated June 14, 1904.

Application filed November 17, 1903. Serial No. 181,522. (No model.)

*To all whom it may concern:*

Be it known that I, CALVIN R. DAVIS, a resident of South Bend, in the county of St. Joseph and State of Indiana, have invented certain new and useful Improvements in Foot-Lifts for Wheel-Plows; and I do hereby declare the following to be a full, clear, and exact description of the invention, such as will enable others skilled in the art to which it appertains to make and use the same.

My invention relates to an improved foot-lift for wheel-plows, the object of the invention being to provide mechanism of this character which will enable the operator by pressure on a foot-lever to elevate the plow-bases and when so elevated will be automatically locked in such position, and the operator may by pressure on a second foot-lever unlock and permit the parts to fall to working position and be either locked or not in working position, as preferred.

With this object in view the invention consists in certain novel features of construction and combinations and arrangements of parts, as will be more fully hereinafter described, and pointed out in the claims.

In the accompanying drawings, Figure 1 is a plan view illustrating my improvements. Fig. 2 is a view in elevation, illustrating the plow locked in its raised position. Fig. 3 is a similar view showing the parts in working position, and Figs. 4, 5, 6, and 7 are enlarged views illustrating various details of construction.

1 represents the parallel side bars of a frame supported on wheels and having depending arms 2 secured thereto. To these arms a crank-shaft or U-frame 3 has rotary mounting at its ends and has rotary connection between its ends to the plow-beam 4, to which any approved form of plow-base 5 is secured. A cast-metal bracket 6 is secured to one side bar 1, extends upward therefrom, has an integral segment 7 thereon, and is made with an elongated hub-bearing 8, in which a bolt 9 has rotary mounting. A foot-lever 10 of the peculiar shape shown and having a foot-rest $10^a$ thereon is secured between its ends on bolt 9 and is pivotally connected at its rear end by a link 11 with a bracket $11^a$, secured to the plow-beam 4. Near the rear end of lever 10 it is made with an integral lateral extension 12, with which an arm 13 is cast integral and is pivotally secured in a bifurcated portion of a foot-lever 14 above the same, having a foot-rest $14^a$ thereon, and between the rear end of said foot-lever 14 and a curved lug 15 on arm 13 a coiled spring 16 is located, inclosing projections on the lever and arm to maintain it in working position and give to the foot-lever 14 a constant upward spring-pressure. The forward end of lever 14 is pivotally connected to a detent or locking-bar 17, movable through an opening in extension 12 and adapted to enter a notch 18 in segment 7 and securely lock the lever 10 and plow-beam 4 in position to elevate the plow-bases, as clearly shown in Fig. 2.

To lower the plow-bases, the operator by a kick or pressure on foot-lever 14 draws back detent or locking-bar 17 from the notch 18 in segment 7, when the plow will of its own weight fall to the ground and by pressure on foot-lever 14 can be forced into the ground to working position. On lever 10 a shoulder or abutment 19 is provided to engage a set-screw 20, mounted in a threaded opening in a laterally-projecting lug 21 on bracket 6, and limit the downward movement of the plow-bases. When in this lowest position, as shown in Fig. 3, the pivotal connections of link 11 with lever 10 and bracket $11^a$ will be in alinement with the fulcrum of lever 10, and the plow-bases will therefore be locked in working position. However, if it is desirable to permit the plow-bases to rise and pass over obstructions the set-screw 20 can be adjusted to limit the movement of lever 10 and hold the pivotal points above mentioned out of alinement, and the operator can by pressure on foot-lever 14 hold the plow to work should the plow-bases have a tendency to rise when coming into contact with hard ground. When it is desired to transport the plow to and from the field or to turn at end of furrow, the operator exerts a forward pressure on foot-lever 10, which through the medium of link 11 elevates beam 4 and the plow-bases, and when the proper elevation is reached the detent or locking-bar 17 will automatically spring into the notch 18 in segment 7 and securely lock the plow in its elevated position.

A great many changes might be made in the general form and arrangement of the parts described without departing from my invention, and hence I would have it understood that I do not wish to restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a plow, the combination with a frame, of a foot-lever fulcrumed between its ends thereon, plow-bases connected with and supported by said foot-lever, a spring-pressed detent carried by said foot-lever and adapted to lock the same in position to hold the plow-bases elevated, and a foot-lever to release said detent from locking position to permit the plow-bases to fall.

2. In a plow the combination with a frame, of a bracket thereon, a foot-lever fulcrumed between its ends on said bracket, a plow-beam carrying plow-bases, a link connecting one end of said lever with the beam, a segment on the bracket having a notch therein, a detent or locking-bar carried by the lever, a spring-pressed foot-lever connected with said detent or locking-bar and adapted to force the same into the notch in said segment and lock the first-mentioned lever in position to maintain the plow-bases elevated and by pressure thereon release said detent from its locked position.

3. In a plow, the combination with a frame, of a foot-lever fulcrumed between its end thereon, a plow-beam carrying plow-bases, a link connecting one end of said lever with the beam, a spring-pressed detent or locking-bar to lock the lever in position to maintain the plow-bases elevated, and a second foot-lever carried by the first-mentioned foot-lever, and adapted to release said locking mechanism and serve as a foot-rest to hold the plow-bases to work.

In testimony whereof I have signed this specification in the presence of two subscribing witnesses.

CALVIN R. DAVIS.

Witnesses:
 EDWIN NICAR,
 FRANCIS C. NIPPOLD.